(12) United States Patent
Schnell et al.

(10) Patent No.: US 6,354,891 B1
(45) Date of Patent: Mar. 12, 2002

(54) CONTACTING APPARATUS AND CONTACT ELEMENT THEREFORE

(75) Inventors: Thomas Schnell, Heilbronn; Andreas Laage, Bietigheim; Gerhard Braun, Blitzfeld, all of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/573,812

(22) Filed: May 19, 2000

(30) Foreign Application Priority Data

May 21, 1999 (DE) .......................... 199 23 045

(51) Int. Cl.⁷ .............................................. H01R 4/48
(52) U.S. Cl. .................................. 439/862; 439/630
(58) Field of Search ................. 439/630, 260, 439/746, 733.1, 607, 736, 862, 188, 60, 946

(56) References Cited

U.S. PATENT DOCUMENTS

| | | | | |
|---|---|---|---|---|
| 5,800,200 A | * | 9/1998 | Brioaud et al. | 439/630 |
| 6,007,387 A | * | 12/1999 | Uchiyama | 439/736 |
| 6,050,857 A | * | 4/2000 | Lok | 439/630 |
| 6,126,486 A | * | 10/2000 | Chang | 439/630 |
| 6,132,229 A | * | 10/2000 | Wu | 439/188 |
| 6,149,466 A | * | 11/2000 | Bricaud et al. | 439/630 |

* cited by examiner

Primary Examiner—Gary Paumen
Assistant Examiner—Felix O. Figueroa
(74) Attorney, Agent, or Firm—Blank Rome, LLP

(57) ABSTRACT

The A contact block, in particular a SIM block, having a holder 14 within which contact elements 13 are inserted; wherein each of grid contact elements 13 comprises support means 87 for abutment at another component, for instance a printed circuit board 11.

24 Claims, 7 Drawing Sheets

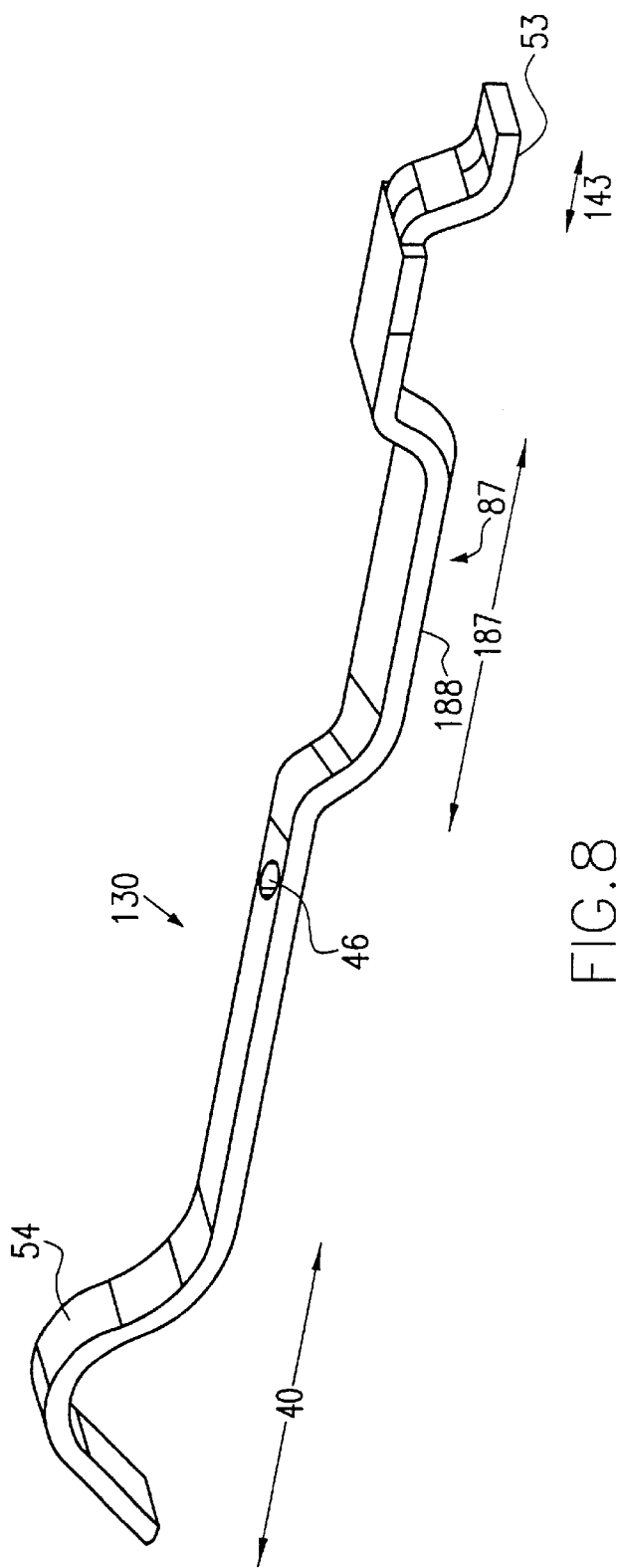
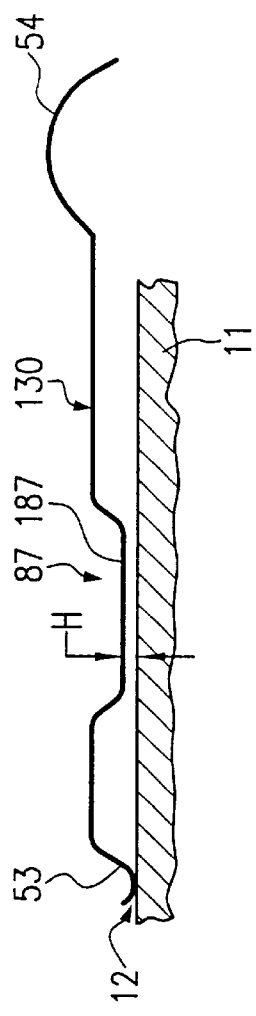
FIG. 8
FIG. 9

CONTACTING APPARATUS AND CONTACT ELEMENT THEREFORE

TECHNICAL FIELD

The present invention relates to a contacting apparatus, which will be referred to below as a contact block. The contact block serves in particular for contacting contacting zones of a so-called smart card. The invention relates in particular to a so-called SIM block (trademark), i. e. a contacting apparatus which is suitable for providing an electrical contact connection to contact zones present on a SIM card.

The invention also relates to a contact element, in particular a contact spring for use in a contact block.

BACKGROUND

Contact blocks for contacting the contact zones of a smart card (also called a chip card) and also for contacting the contact zones of a SIM card are known in many different designs. With the ongoing desire to miniaturize the apparatuses in which the smart cards are used, for instance the mobile telephones, a small size for the contact blocks becomes more and more important. Indeed, all components of said apparatus need to become smaller.

SUMMARY OF THE INVENTION

The present invention intends, in particular, to provide a SIM block which has a very small height, for instance in the range of 0.8 mm.

According to the present invention a small height for the SIM block is obtained by providing contact elements for the SIM block, such that as the contact force exerted by the contact zones of a SIM card onto the contact elements is transmitted by support means formed by or provided at the contact elements to another component, in particular, a circuit board which is adapted to support said SIM block.

The invention further provides for adjustment means, which are preferably provided together with the support means to thus provide for the possibility of adjusting the force, by means of which the contact elements press against the contact zones of the SIM card.

Preferred embodiments of the invention are disclosed in the claims.

BRIEF DESCRIPTION OF DRAWINGS

FIG. 8 is another embodiment of the contact element;

FIG. 9 is a contact element of FIG. 8 mounted on a circuit board.

BEST MODE FOR CARRYING OUT THE INVENTION

Figure 1:
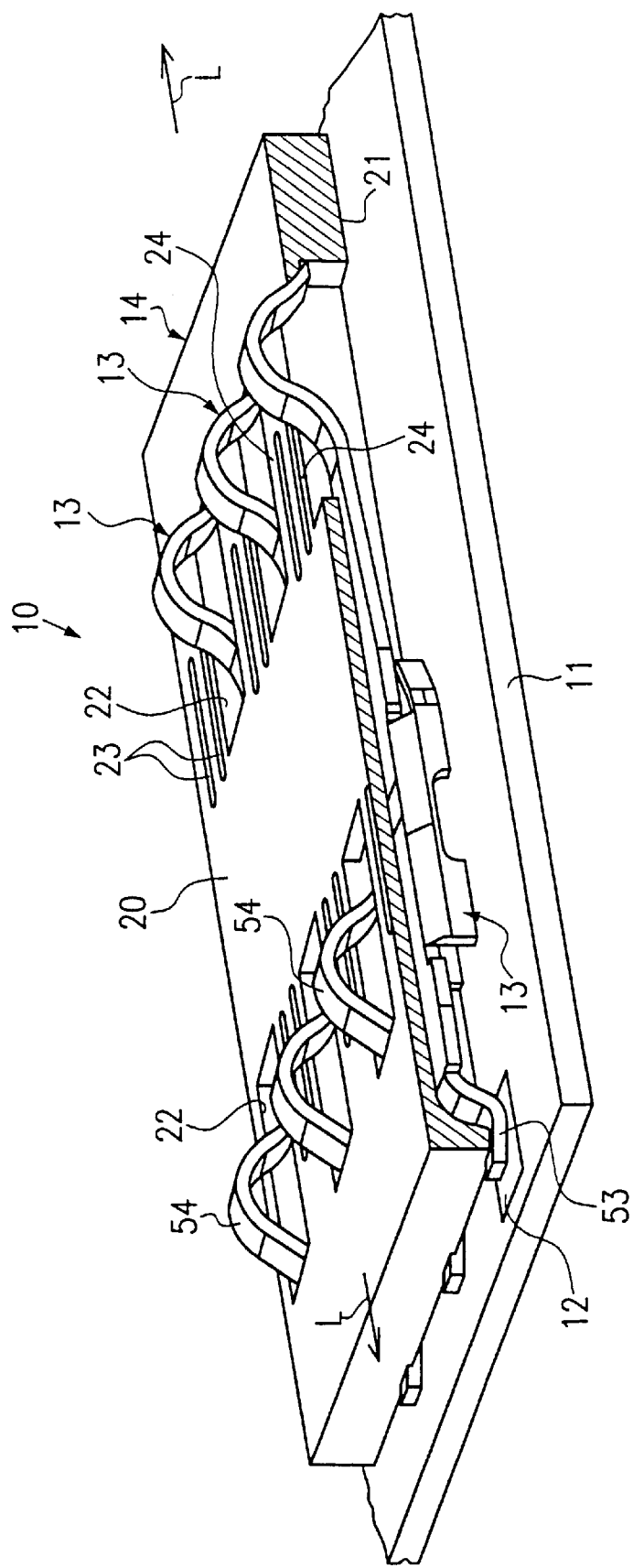
FIG. 1 is a perspective top plan view of a SIM block arranged on a circuit board.

Throughout the specification and figures, like reference numerals refer to like components or parts. Referring to FIG. 1, there is shown a contacting apparatus 10 in the form of a SIM block 10, which is mounted on a printed circuit board 11. The SIM block 10 comprises contact elements 13 and a contact support or holder 14, within which the contact elements 13 are mounted.

As shown in FIG. 1 the circuit board 11 comprises soldering surfaces 12 with which the contact element 13 can be physically and electrically connected by soldering a soldering zone of the contact element 13 to the soldering surface 12. The soldering zone is formed by a termination end 53 of the contact element 13, as will be described below.

It should be noted that, alternatively, the circuit board 11 could be provided with contact surfaces instead of soldering surfaces 12. At said contact surfaces of the circuit board 11 pressure contact zones of the pressure contact elements could resiliently abut.

The holder 14 is, see FIG. 1, preferably made of plastic material and comprises an upper surface 20 and a lower or bottom surface 21. Slotlike openings (short slots) 22 extend through the thickness of the wall forming the upper surface 20 of the holder 14. Said slots 22 allow bulged contact ends 54 of the contact elements 13 to extend therethrough to a level above the upper surface 20. In the shown embodiment six contact elements 13 are used. The contact elements 13 are mounted in said holder 14 in an interleaving manner, with the termination ends 53 located in opposite directions in an alternate manner. The termination ends 53 of the six contact elements 13 are soldered alternately to soldering surfaces 12.

Slots 23 are provided in the holder 14, in the area where the bulged contact ends 54 project beyond the upper surface 20. The slots 23 define ribs 24 in the holder 14 and provide a certain amount of resiliency, so that they can be deflected transversally with respect to the longitudinal direction L (FIG. 1) of the SIM block 18, when the contact elements 13 are inserted into the holder 14. Said slots 23 are located in the vicinity of projections 126, 127 (FIGS. 2 and 4) yet to be described.

Figure 2:
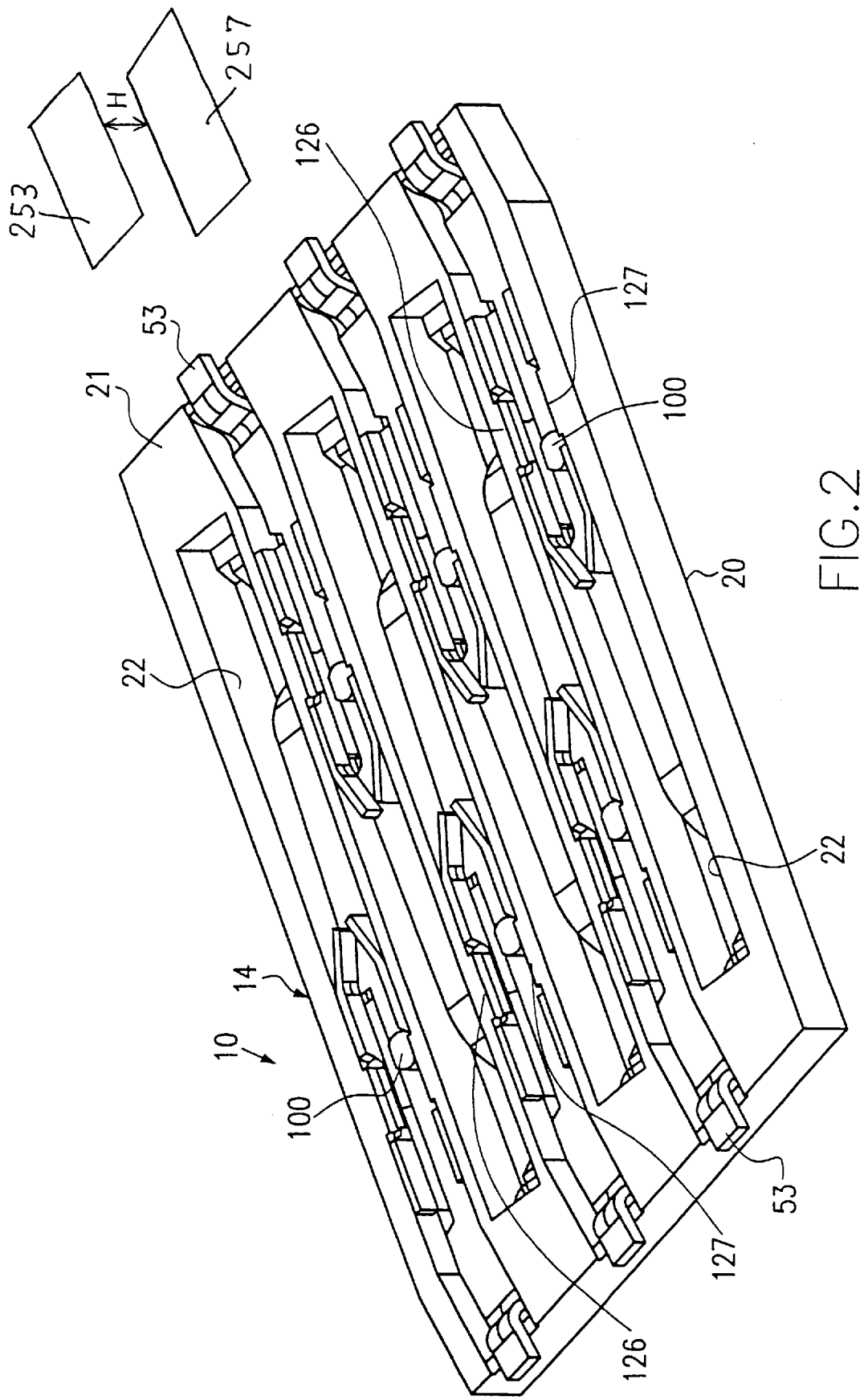
FIG. 2 is a perspective view of the bottom side of the SIM block of FIG. 1 without the circuit board.
Figure 4:
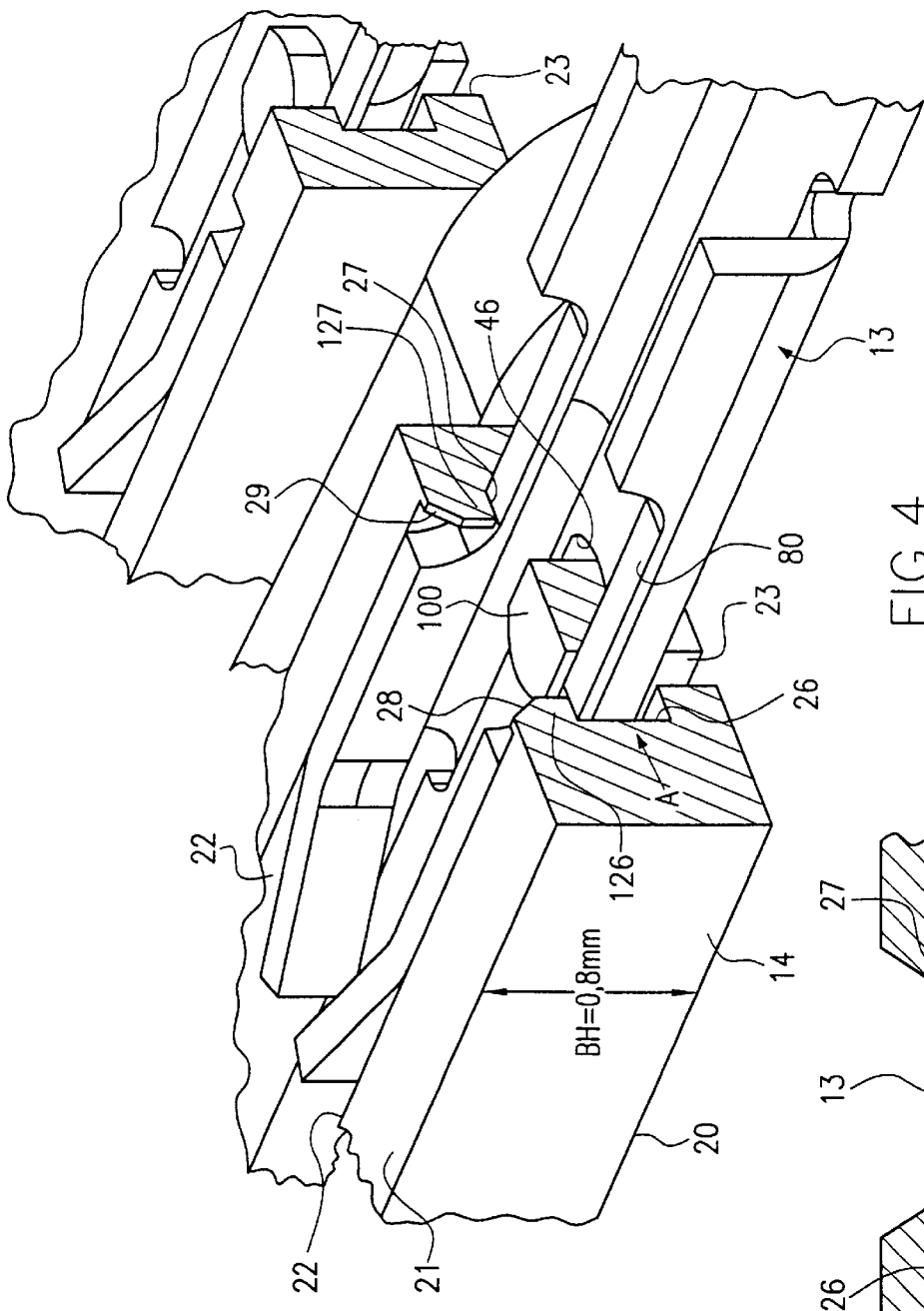
FIG. 4 is a schematic partial sectional view through the SIM block of FIGS. 1 and 2.

As can be recognized in FIG. 2, the slots 22 are at least partially open at each of the two small sides of the holder 14, in an alternate manner. Detent recesses 26, 27, see FIG. 4, are provided in holder 14 and are adapted to receive each one contact element 13. Inclined portions 28, 29 allow easy insertion of the contact element 13 into the recesses 26, 27. The recesses 26, 27 are located in the area of the slots 23. The recesses 26, 27 are formed in respective oppositely located projections 126, 127 of the holder 14. The projections 126, 127 project, see FIG. 4, into the slots 22.

Figure 7:
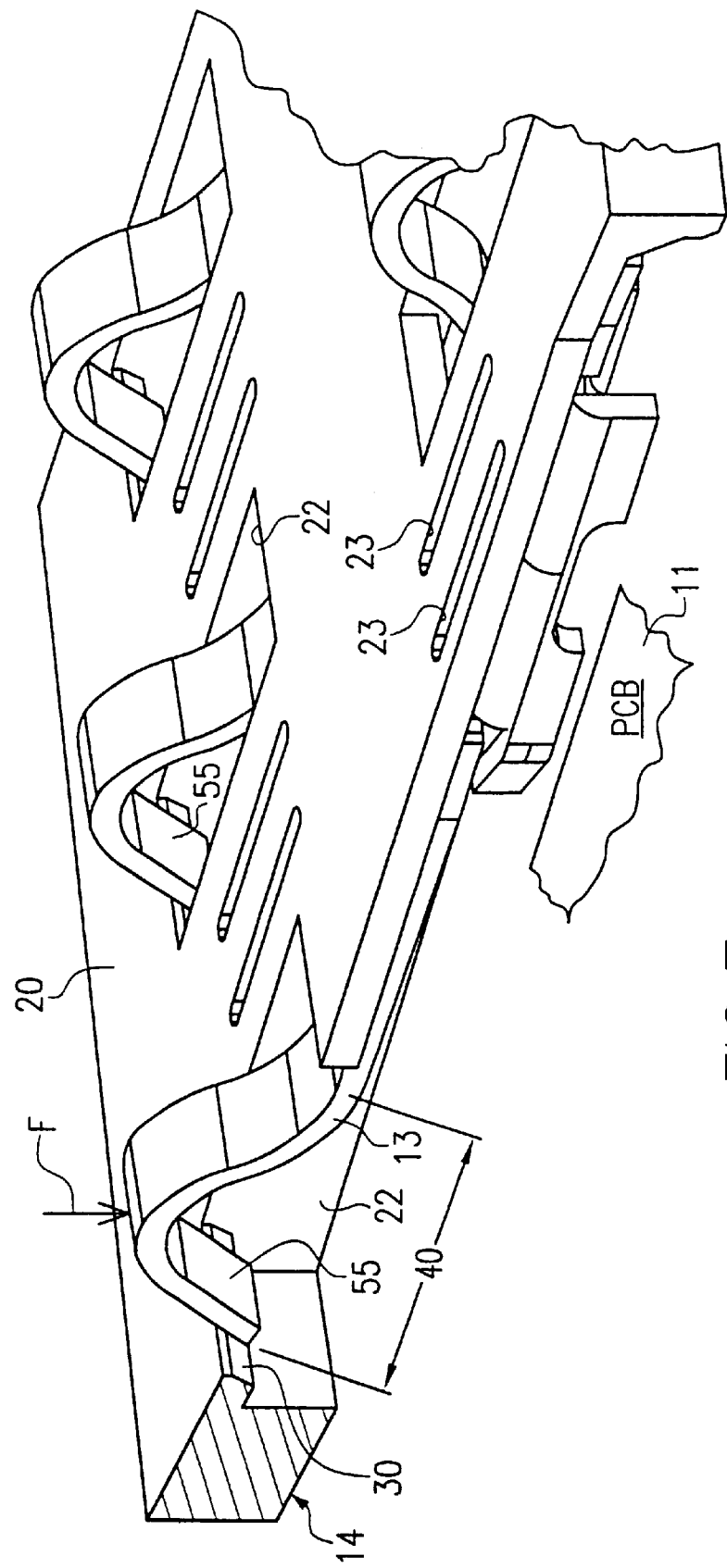
FIG. 7 is a further perspective sectional view of a part of the SIM block of FIGS. 1–6.

The holder 14 forms—see FIG. 7—at the closed end of each slot 22 an abutment incline 30. If no force F is applied by a SIM card pressing against the contact elements 13 (see FIG. 7), abutment portions 55 of the contact elements 13 are in biased abutment with the abutment inclines 30.

Figure 3:
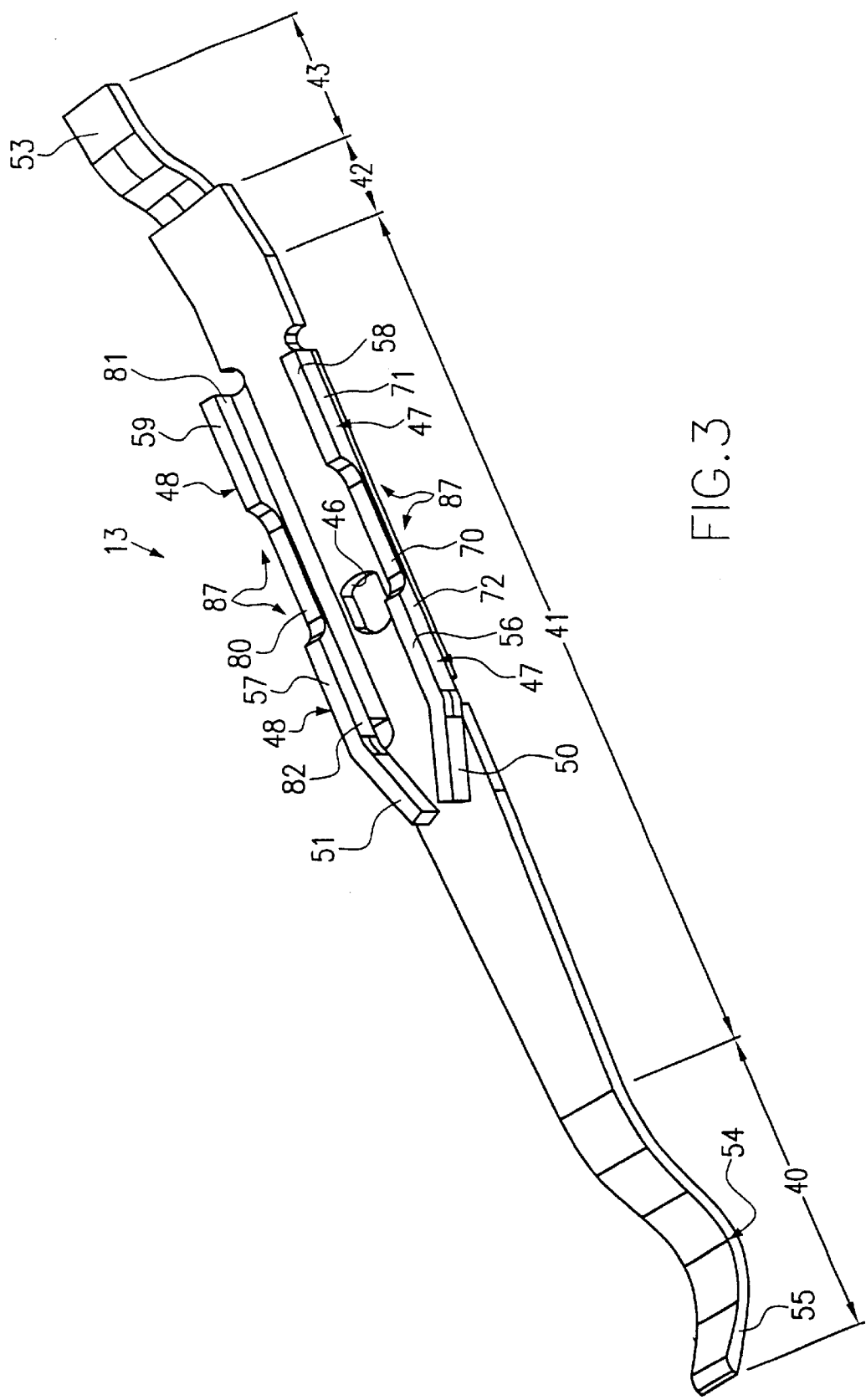
FIG. 3 is a perspective view of a contact element of the invention as used in the SIM block shown in FIGS. 1 and 2.

FIG. 3 shows the contact element 13 in form of a contact spring, which has in substance an elongate form and comprises the following sections; a contact section 40 for contacting a contact zone of a SIM card, a connecting is and spring section 41, an abutment section 42 and a termination section 43. In the termination section 43 the termination end 53, already mentioned, is formed.

In the connecting and spring section 41 an opening 46 is formed, which is for example used for connection with the holder 14. In the connecting and spring section 41 support means 87 are provided adjacent to the abutment section 42. The support means 87 are preferably integrally formed as a single piece with the contact element 13. The support means 87 comprise at both sides, rib means 47, 48. Said rib means 47, 48 form at their ends facing towards the contact section 40, arms 50, 51. The arms 50, 51 (also called adjustment springs 50, 51) transfer the force to the circuit board 11. The two adjustment springs 50, 51 provide for adjustment of the force by changing the inclination of the adjustment springs 50, 51 with respect to the longitudinal axis L of the contact block. Alternatively, the length of the adjustment springs 50, 51 could be changed. The rib means 47 comprise two ribs 71 and 72, separated by a recess 70. The rib means 48 comprise two ribs 81 and 82, separated by a recess 80. The detent mounting of the contact elements 13 in the holder 14 occurs preferably, as will be explained below in detail, in the area of the recesses 70 and 80.

The rib means 47, 48 comprise preferably abutment surfaces 56, 57, 58, 59 arranged on the same level, forming an abutment plane 257 (FIG. 2) described below. The abutment surfaces 56–59 are adapted to be placed on the circuit board 11.

Each of said contact elements 13 comprises in the termination section 43 said termination end 53 and in the contact section 40 the already mentioned bulged contact end 54. Adjacent to the contact end 54 an abutment portion 55 is formed.

Figure 6:
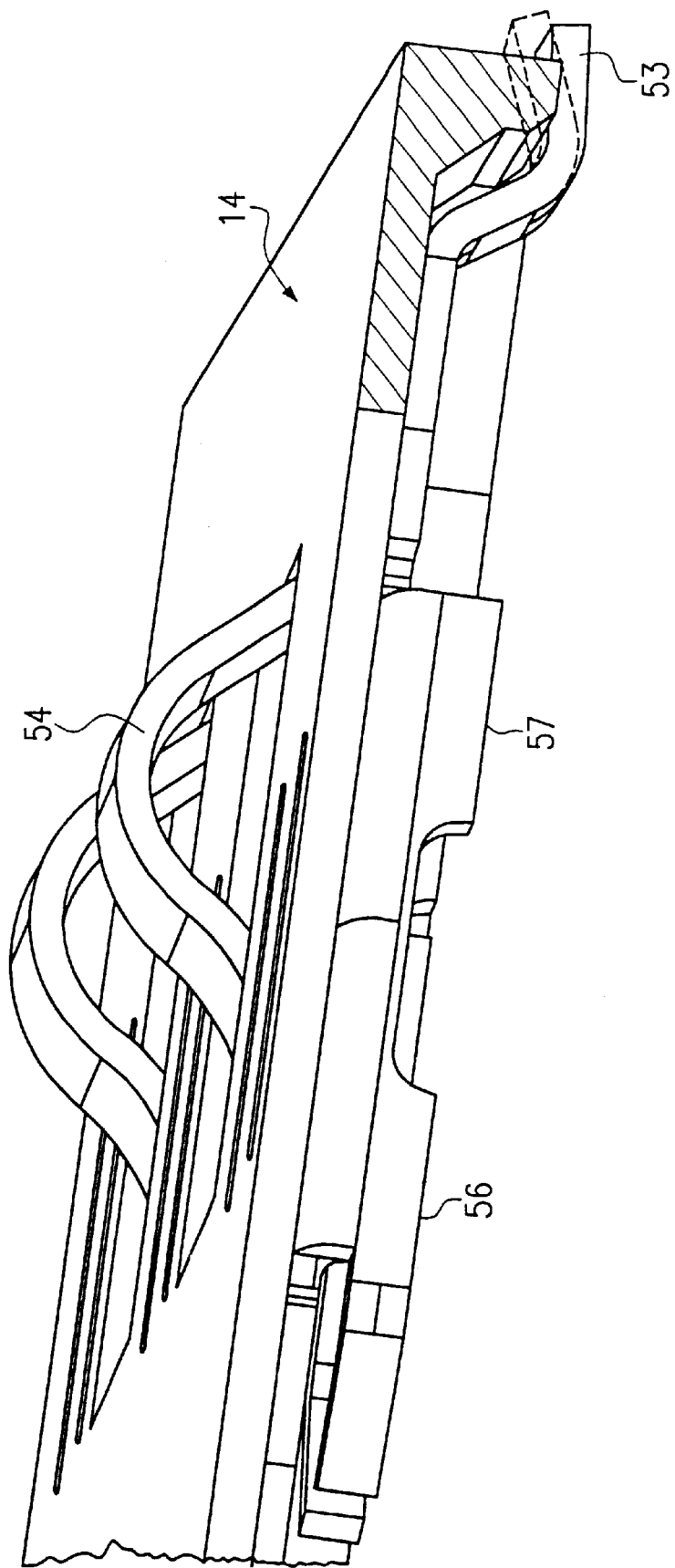
FIG. 6 is a perspective view of a part of the SIM block of FIGS. 1–5.

As one can readily see in FIG. 6, the termination ends 53 are biased, so that all the termination ends 53 are located in the same plane, i. e. are coplanar.

Figure 5:
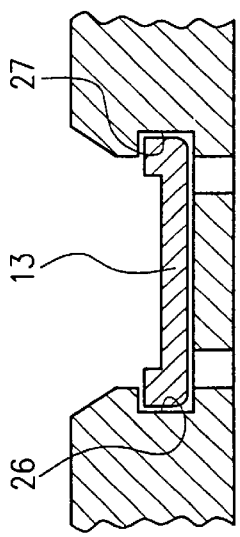
FIG. 5 is a detail in cross section in the area A in FIG. 4.

FIG. 2 as well as FIGS. 4 and 5 show in particular the detent mounting of the contact elements 13 in the support 14. As mentioned, the support 14 forms in the area of the slots 22 projections 126 and 127. The projections 126 and 127 are arranged on both sides of the slots 22 and extend into the interior of said slots. The recesses 26 and 27 formed in the projections 126 and 127 are adapted to receive the contact elements in the area of the recesses 70 and 80.

FIG. 4 discloses that the support 14 forms a post 100 which projects through the opening 46 of the contact element 13, when the contact element 13 is in its mounted position in the support 14. The post or projection 100 serves for guiding and mounting said contact element 13. It is possible that the upper end of the post 100 is coined (pressed) onto the contact element 13 so as to fixedly mount said contact element 13 at the support 14. In such a case it is conceivable that the contact element 13 does not need to be mounted in the support 14 by detent means. More than one post 100 and more than one opening 46 can be provided.

FIG. 4 discloses further that the height BH of the contact block 10 is small, for instance in the area of 0.8 mm. For all practical purposes, the height BH of the contact block 10 is determined by the height of the contact element 13.

Both FIG. 2 and also FIG. 4 show clearly that the contact elements 13 can be inserted in accordance with the invention from the bottom side 21 of the holder 14 (see also FIG. 1) into said holder 14.

FIG. 6 discloses that the contact element 13, when fixedly mounted in the holder 14, is biased against said holder 14 in its termination area 43. As can be seen in FIG. 6, the termination end 53 of the termination section 43 is, prior to the insertion of the contact element 13 into the holder 14, in the position shown by a dotted line. After the insertion of the contact element 13 into the holder 14 the termination end 53 assumes the position shown with solid lines, and is biased against the contact element 13. In this manner, coplanarity is readily achieved.

FIG. 7 discloses in detail the fact that the contact element 13 is biased with its contact section 40 against the holder 14. In particular, the abutment portion 55 of the bulged contact end 54 is in abutment with an abutment incline 30 of the holder 14. FIG. 7 also discloses schematically the path of the force via the two adjustment springs 50, 51 onto the circuit board 11.

FIG. 2 shows that six contact elements 13 are inserted into the holder 14 and are fixedly mounted therein due to the fact that the areas of the contact elements 13 comprising the recesses 70, 80 have been pressed through the gaps formed by the projections 126 and 127. During insertion of a contact element 13 into the holder 14 the contact element 13 is guided by the inclined portions 28 and 29 of the projections 126 and 127, resiliently bending the projections 126 and 127 away from each other. As soon as the portions of the contact element 13, having the recesses 70, 80, are located in the recesses 26 and 27, the projections 126 and 127 move back into the positions shown in FIG. 4 and thus fixedly hold the contact element 13 in the holder 14. The projections 126, 127, the recesses 26, 27 and the contact elements 13 form together detent means.

FIG. 2 discloses that the six contact elements 13 inserted into the holder 14 define with the upwardly facing surfaces (FIG. 2) of the six termination ends 53 a soldering plane 253, shown schematically in FIG. 2. It should be noted that in FIG. 2 the contact elements 13 are soldering contact elements, and, as such, are shown with soldering termination ends 53.

As mentioned before the abutment surfaces 56 to 59 define an abutment plane 257 as is shown schematically in FIG. 2.

In accordance with the invention it is assured that between the soldering plane 253 and the abutment plane 257 a small gap or a height difference H remains after the soldering operation. Said gap H assures that the contact block 11 can be soldered to the circuit board 11 without any problems. When the contact elements 13 are in contact with the contact zones of a SIM card, of course that gap disappears and the abutment surfaces 56–59 are in abutment with the upper surface of the circuit board 11 so as to transfer the force thereto.

FIG. 8 discloses another embodiment of a contact element 130, which corresponds in some respects to contact element 13. Contact element 130 comprises like the contact element 13 a contact section 40 and a termination section 143. Moreover, as with contact element 13, contact element 130 comprises an opening 46 for cooperation with a post 100 of the holder 14.

In the embodiment of FIG. 8 the support means 87 is not formed by rib means, but the support means 87 is formed by a bulged or bight section 187 of contact element 130. A bottom surface 188 of the bulged portion or section 187 can be in abutment with the surface of a circuit board 11 so as to transmit the contact force directly onto the circuit board 11.

FIG. 9 discloses for the contact element 130 that in accordance with the invention a small gap or a height difference H can be provided between a soldering plane and an abutment plane similar to what was described in relation with FIG. 2 for contact element 13. In this case, the bottom surfaces 188 of the contact elements 130 form an abutment plane similar to the abutment plane 257 explained above.

As shown in FIG. 1, the termination means, i. e. the connection between the termination ends 53 with the soldering surfaces 12 of the printed circuit board 11 extend outwardly from the support 13. Thus, the soldering points of the soldering contact elements can be checked after the soldering operation has been carried out.

As mentioned, the termination ends 53 could also be formed as pressure termination ends and not, as shown, as SMT termination ends.

The invention provides for a safe and secure support of the contact elements on a circuit board 11 or any other component. The invention further provides for a small height of the contact block 10. Moreover it is readily possible to adjust the force of the contact element without requiring additional components.

As explained above, coplanarity can be obtained without adjustments.

The small height of the contact block 10 is particularly due to the fact that the contact elements 13, 130 are supported directly on the printed circuit board 11. There is no need to provide for an insulating layer of the holder 13 between the contact elements 13, 130 and the upper surface of the printed circuit board 11.

Generally speaking, the contact elements 13 and 130 can be adjusted and optimized by changing the geometry of the contact element. Further, instead of using slots 23 in the contact support 14, it is also possible to provide slots in the contact element 13, 130 in the area where the detent mounting is provided.

Instead of the detent mounting of the contact elements, the contact elements could be mounted in a different manner at the holder contact support 14. For instance, the contact elements could be provided with claws, which penetrate into the insulating material, out of which the holder 14 is formed, so as to fixedly mount said contact elements in the holder 14. The contact elements 13, 130 could also be fixedly mounted in said holder 14 by, as mentioned above, coining operations.

Other aspects, objects and advantages of the present invention can be obtained from a study of the drawings, the disclosure and the appended claims.

What is claimed is:

1. A contact block for a smart card reader, the contact block abutting a circuit board of the smart card reader; the contact block comprising:
   a holder and contact elements inserted therein;
   wherein each of said contact elements comprises a support portion abutting the circuit board to support the contact against contacting force of a smart card and wherein said contact elements are contact springs, which extend in a generally longitudinal direction and comprise at one end thereof a termination section and at an opposite end thereof a contacting section including a bulged contact end, wherein the support portion is between said termination section and said contact section.

2. The contact block of claim 1, wherein the contact elements comprise openings and are fixedly mounted in the holder by one or more posts formed by said holder, which project through respective ones of the openings in the contact element.

3. The contact block of claim 1, wherein said ribs comprise arms, which can be changed with regard to their angular location and/or with respect to their length.

4. The contact block of claim 3, wherein the arms are located in a connecting and spring section of said contacting element pointing towards a contact section of said contact element.

5. The contact block of claim 2, wherein said post projects into an opening of the contact element and is coined.

6. The contact block of claim 1, wherein said holder comprises holder recesses, said recesses being adapted to receive parts of said contact element, said parts being held in said holder due to detent action.

7. The contact block of claim 6, wherein the contact element comprises rib recesses, which are adapted to be inserted into said holder recesses due to detent action.

8. The contact block of claim 7, wherein the holder comprises slots in an area where the detent action occurs.

9. The contact block of claim 6, wherein said holder recesses are comprised by projections formed by said holder.

10. The contact block of claim 1, wherein the smart card is a miniature smart card.

11. The contact block of claim 10, wherein the smart card is adapted to use in a mobile telephone.

12. The contact block of claim 1, wherein the support portion is formed as a single piece integrally together with the contact elements.

13. The contact block of claim 1, wherein the ribs comprises oppositely located ribs separated by a rib recess.

14. The contact block according to claim 1, wherein the support portion comprises a bulged section of the contact element.

15. The contact block according to claim 1, wherein the contact elements are fixedly mounted in said holder by detent means.

16. The contact block of claim 1, wherein the holder comprises slots adapted to receive said contact elements.

17. The contact block of claim 1, wherein said contact element mounted in said holder is biased against said holder in said termination section of the contact element.

18. The contact block according to claim 1, wherein the contact element is biased against the holder with an abutment portion in said contacting section of the contact element.

19. The contact block of claim 1, wherein, when the contact elements are inserted in the holder
   a) termination ends of the contact elements define a soldering plane,
   b) abutment surfaces of the contact elements define an abutment plane, and
   wherein the soldering plane and the abutment plane are separated by a height difference H.

20. The contact block of claim 1, wherein the contact elements are inserted into the holder from a bottom surface.

21. The contact block of claim 1, wherein said contact elements are soldering contact elements.

22. The contact block of claim 1, wherein the contact elements are pressure contact elements.

23. The contact block of claim 1, wherein said contact block is a SIM block.

24. The contact block of claim 1, wherein the block includes a height of less than or equal to about 0.8 mm.

* * * * *